Nov. 17, 1931.    L. H. EAKINS    1,832,479
TIRE BALANCING MECHANISM
Filed June 28, 1928
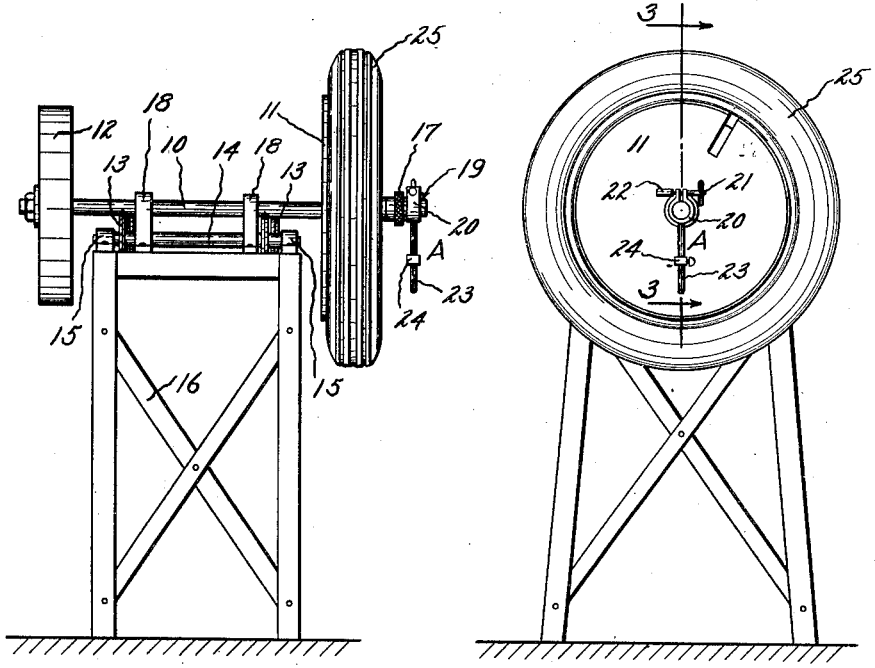
Fig. 1.    Fig. 2.
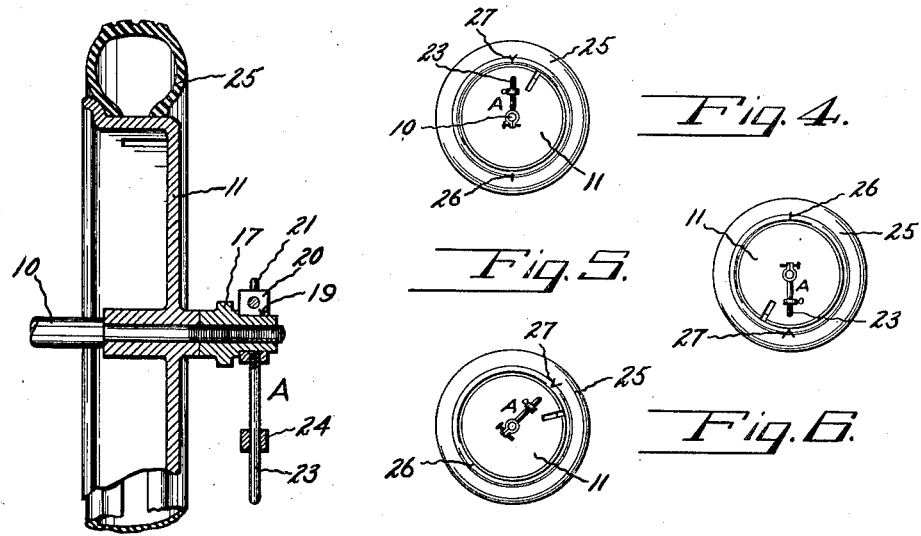
Fig. 3.    Fig. 4.
Fig. 5.    Fig. 6.
INVENTOR.
LAWRENCE H. EAKINS.
BY
ATTORNEY.

Patented Nov. 17, 1931

1,832,479

UNITED STATES PATENT OFFICE

LAWRENCE H. EAKINS, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS

TIRE BALANCING MECHANISM

Application filed June 28, 1928. Serial No. 288,927.

My invention relates to new and useful improvements in mechanism upon which pneumatic tires are balanced. The purpose of the invention is to provide a mechanism of simple construction which may be easily and quickly operated. Another purpose is to provide a mechanism which will indicate the heavy portion of a tire casing. Other purposes will appear in the following specification and claims.

In the drawings which illustrate one embodiment of my invention,

Fig. 1 is a side view of the mechanism showing a tire casing in place;

Fig. 2 is a view looking in at the right of Fig. 1;

Fig. 3 is a view taken substantially on line 3—3 of Fig. 2; and

Figures 4, 5, and 6 are detail views of the operation of the mechanism.

In the mechanism the balancing unit, made up of a shaft 10 carrying a tire supporting drum 11 at one end and a counter-balance wheel 12 at the other, is supported on two pair of edged supporting rollers 13. These rollers are mounted on a pair of shafts 14 fixed in bearings 15 supported on a frame or pedestal 16. The parts constituting the balancing unit are balanced separately so that tire supporting drums of various sizes may be used on the same mechanism. A hand nut 17 keeps the tire supporting drum 11 in place on the shaft 10. A pair of straps 18 on the frame and arching over the shafts 10 and 14 keep the balancing unit in place on the rollers 13.

The nut 17 is provided with a bearing surface 19 adapted to have a balance indicator A fit on it. This indicator is made up of a split, contractible ring 20 having a hand screw 21 for clamping the ring to the bearing surface 19. A weight block 22 on the opposite side of the screw 21 is used to counter-balance the weight of the screw. Extending from the ring on the side opposite the screw 21 and weight bar 22 is a rod 23 adapted to carry an adjustable block 24. The adjustable block 24 may be fixed in place on the rod 23 so that the indicator A, when locked on the surface 19, will indicate whether or not the tire's off-balance is less or greater than a predetermined allowable off-balance.

The balancing mechanism operates as follows: With the balance indicator A hanging loosely on the surface 19, a tire 25 is placed on the drum 11 and allowed, together with the balancing unit, to come to rest. The portion of the tire directly below the center of the balancing unit is marked with some convenient mark 26. The indicator A is then locked by the screw 21 on the nut 17 so that the rod 23 will extend opposite the mark 26 as shown in Figure 4. If the balancing unit, now including the indicator A as well as the tire 25, remains in this position the tire will be found off-balance greater than the allowable off-balance. This may be remedied by adding a quantity of rubber cement to the inner surface of the tire opposite the heavy portion whereupon the tire is rebalanced. If, however, the unit will pivot around so that the indicator will take the position as shown in Figure 5, the error of balance of the tire is less than the allowable off-balance. Likewise, if the balancing unit will remain in any position in which it may be placed, as in Figure 6, it will be an indication that the error of balance is just at the limit of error. After balancing the tire may be marked, if desired, with an indelible marking 27, opposite the mark 26, for locating the valve stem of an inserted tube.

A portion 28 of the balancing drum 11 may be cut away to allow for a valve stem in case it is desired to balance an assembled tire and tube.

Having thus described my invention, I claim:

1. A tire balancing mechanism comprising a support, a plurality of aligned rollers on the support, a shaft adapted to be supported by the aligned rollers, a tire supporting drum on one end of the shaft, a counter-balance wheel on the other end of the shaft, a nut on the shaft adapted to hold the said drum in place and having a hub, and a balance indicator adapted to be locked over the said hub and to be set to the allowable limit of overbalance of a tire being balanced.

2. A tire balancing mechanism comprising a support, a shaft mounted for free rotation on the support, a tire supporting drum secured to one end of the shaft and a counter-weight secured to the other end of the shaft, a radially extending guide rotatable with the shaft and a balancing weight movable along the guide.

3. A tire balancing mechanism comprising a support, a plurality of aligned rollers on the support, a shaft adapted to be supported by the aligned rollers, a tire supporting drum on one end of the shaft, a counter-balance wheel on the other end of the shaft and a weight mounted for radial movement with respect to the shaft.

4. A tire balancing mechanism comprising a support, a plurality of aligned rollers on the support, a shaft adapted to be supported by the aligned rollers, a tire supporting drum on one end of the shaft, a counter-balance wheel on the other end of the shaft, a radially extending guide rotatable with the shaft and a balancing weight movable along the guide.

LAWRENCE H. EAKINS.